Dec. 22, 1964    L. DEMAS ETAL    3,162,270
VEHICLE WHEEL ASSEMBLY
Original Filed April 27, 1962    2 Sheets-Sheet 2

INVENTORS.
LOUIS DEMAS.
NORBERT W. TESCH.
BY *Carl J. Barbee* ATTORNEY

United States Patent Office 3,162,270
Patented Dec. 22, 1964

3,162,270
VEHICLE WHEEL ASSEMBLY
Louis Demas, Oak Park, and Norbert W. Tesch, Grosse Pointe Farms, Mich., assignors to American Motors Corporation, Kenosha, Wis., a corporation of Wisconsin
Continuation of application Ser. No. 190,587, Apr. 27, 1962. This application July 2, 1962, Ser. No. 206,793
2 Claims. (Cl. 188—2)

The invention relates to a wheel and axle assembly and braking apparatus associated therewith for use with a vehicle of the type capable of operation on land or water.

The invention has particular reference to improvements over prior devices of this nature.

This application is a continuation of the co-pending application of Louis Demas, Serial No. 190,587, filed April 27, 1962, for Vehicle Wheel Assembly, and abandoned as of August 13, 1963.

A specific object of the invention is to provide in a wheel assembly, a wheel hub and hub support member employing two wheel bearings and two seals in the annular chamber therebetween.

Another specific object is to provide improved means for mounting the wheel hub with reference to the hub support and for effecting wheel bearing adjustment.

A further object is to provide improved means for mounting an O-ring between the wheel body and the wheel brake drum housing.

A further object is to provide an improved backing or brake shoe carrying plate and means for anchoring same relative to the hub support for resisting radial shear forces imposed on the anchoring means during braking.

A further object is to provide a hub support with appropriate passages for feeding the wheel cylinder and for effecting brake bleeding exteriorly of the brake drum housing.

Figure 1:
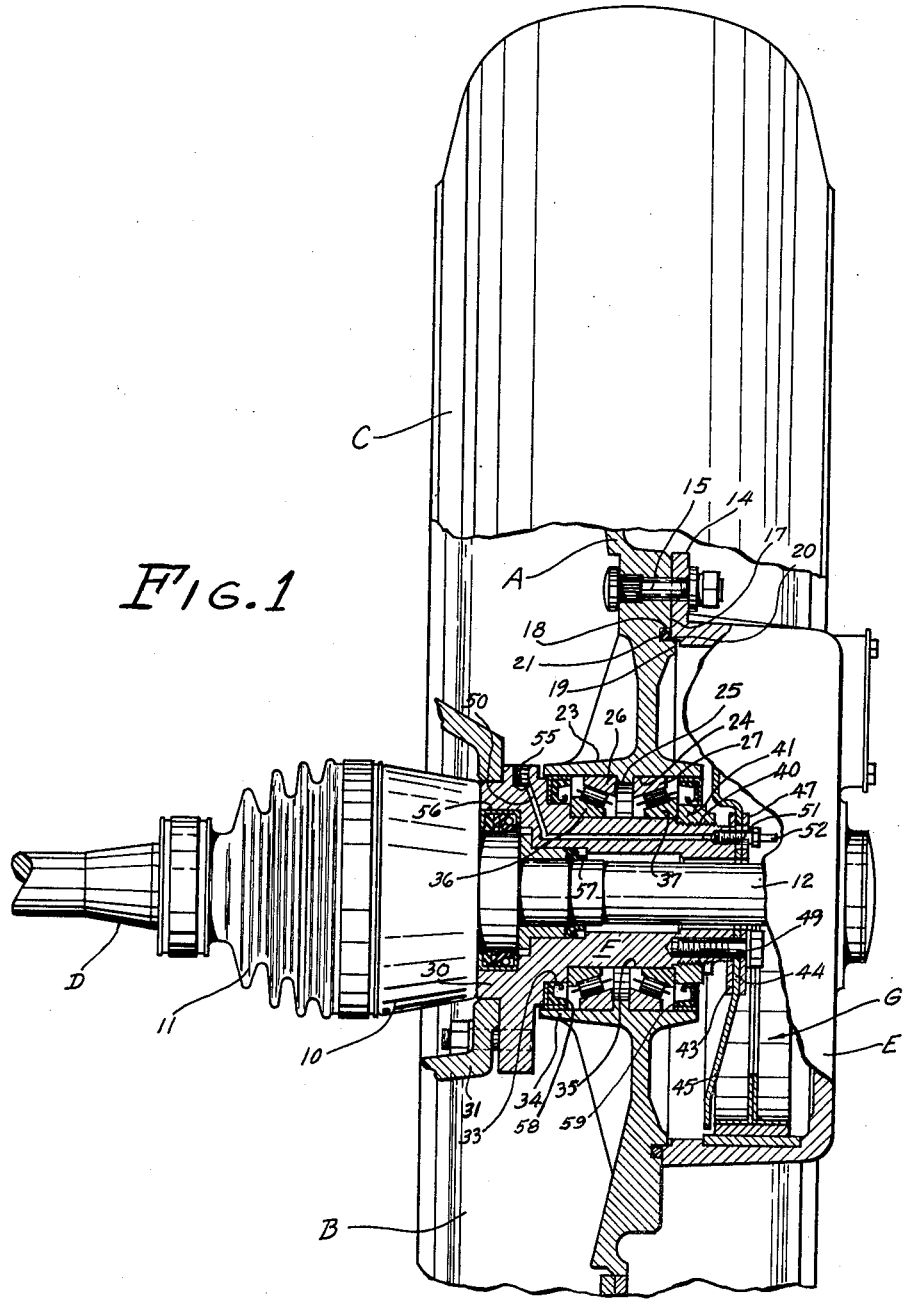

Other objects and advantages of the invention will be apparent from the ensuing specification and appended drawings in which:

FIGURE 1 discloses a fragmentary view of a vehicle wheel with the inventive subject matter shown in section.

Figure 2:
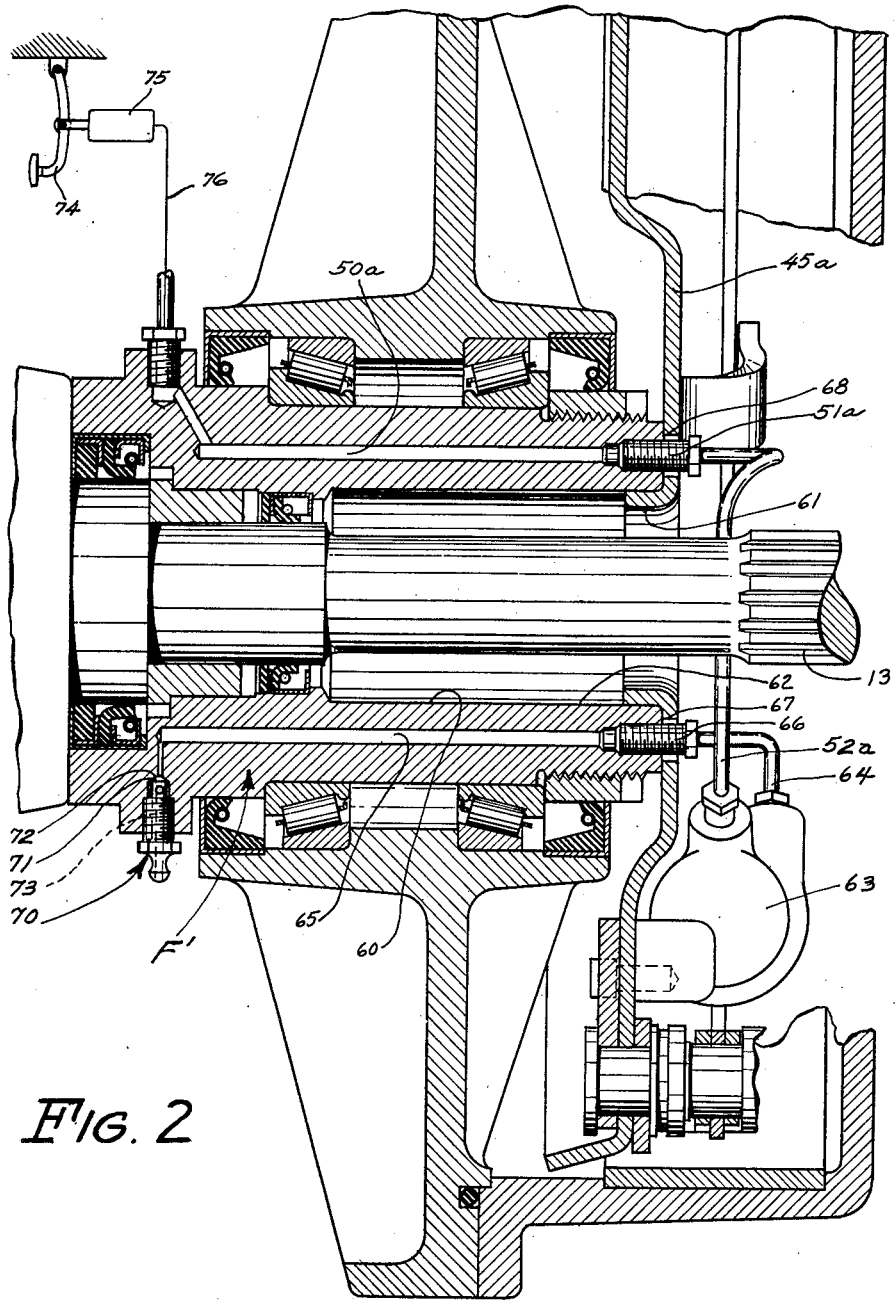

FIGURE 2 is a fragmentary sectional view of a modified form of the invention.

In general, the vehicle wheel and axle assembly includes an annular body portion A which is anchored to the wheel rim B on which the tire C is mounted. The axle D is drivingly connected to the brake drum housing E for rotating the wheel relative to the hub support F. The brake assembly G is mounted interiorly of the brake drum housing.

The axle D is provided with a universal joint (not shown) of conventional construction and housed within the boot retainer housing 10. A flexible boot 11 prevents the entry of foreign material into the universal joint. The wheel spindle 12, which is driven by the axle, is removably connected to the brake drum housing as by means of a conventional spline type conneciton 13.

The brake drum housing has circumferentially spaced radially outwardly projecting ears 14 and suitable bolts 15 serve to anchor the housing relative to the wheel body A. There may be as many as five of such bolts equally circumferentially spaced about the wheel (only one of which is shown). The wheel body has an annular wall surface 17 and an annular groove 18 formed in such face. The annular flange 19 projects radially outwardly beyond the face 17 and provides a piloting shoulder 20 for the flexible O-ring 21, thereby reducing the possibility of the O-ring becoming dislodged from the annular groove during the assembly of the brake drum housing to the wheel body. The O-ring prevents entry of foreign material into the interior of the brake drum housing (such as water, when the wheel assembly is substantially submerged).

The wheel body is provided with a cylindrical hollow hub portion 23. The cylindrical internal wall 24 of the hub has a radially inwardly extending annular shoulder 25 against the opposite side faces of which the outer bearing races 26 and 27 abut.

The non-rotative hub support F has its inner end 30 diametrically reduced for mounting a support housing 31. The support housing is connected to upper and lower suspension arms (not shown) for carrying the vehicle wheel relative to the vehicle body (which is not shown). The hub support has a diametrically reduced annular shoulder 33 for receiving the seal 34 and a further diametrically reduced bearing surface 35 for mounting the inner races 36 and 37 of the bearings.

The outer end of the hub support is provided with external threads 40 and a collar 41 is threaded thereonto and is tightened against the bearing race 37 for anchoring the bearings and the wheel hub with reference to the hub support.

Plate 43 may be welded to the central portion 44 of the brake shoe carrying or backing plate 45 and has a central opening for being piloted onto the outer end of the hub support which extends into such opening. An additional plate 47 is mounted on the opposite side of the backing plate and is appropriately apertured (as well as the backing plate and plate 43) for receiving a number of circumferentially spaced bolts 49 for anchoring the backing plate assembly to the outer end face of the hub support. There may be several such bolts 49, only one of same being shown. The plate 43, being piloted onto the end of the hub support, thereby serves to resist radially directed shear forces imposed on the anchoring bolts 49 during vehicle braking.

The brakes are of the hydraulic type and a fluid passage 50 extends through the hub support to the fitting 51 which receives tubing 52. The wheel cylinder to which the tubing 52 extends is not shown since it is of conventional construction. A suitable tubing leading from the brake master cylinder (not shown) leads to the fitting bore 55. Suitable seals 56 and 57 are interposed between the wheel spindle and the hub support for preventing the escape of lubricant into the interior of the brake drum housing. Seals 58 and 59 close off the opposite ends of the bearing chamber formed between hub and hub support.

In the modified form of the invention shown in FIGURE 2 the hub support F' has its internal wall 60 adequately spaced from the wheel spindle to accommodate the flange 61. The flange 61 is integral with the brake shoe carrying or backing plate 45a and is axially directed into the bore 62 in the hub support thereby serving to resist the radially directed shear forces imposed on the anchoring bolts 49 during vehicle braking, the bolts 49 are not being shown in FIGURE 2.

Anchored to the backing plate is a hydraulic wheel cylinder housing 63 of generally conventional construction with an incoming fluid feed conduit 52a and a bleed conduit 64. The wheel cylinder is mounted toward the lower end of the backing plate in order that the fluid therein be maintained at a level beneath that of the bleed passage 65. The bleed passage extends generally lengthwise of the hub support and is internally threaded at one end to receive the conduit fitting 66 which projects through a suitable aperture 67 formed in the backing plate. A similar aperture 68 accommodates the fitting 51a which is also threaded into the end of passage 50a which communicates with conduit 52a.

The passages 50a and 65 may be situated in the hub support circumferentially thereof at approximately diametrically opposite locations. A normally closed bleed valve 70 is threaded into the exit end of passage 65 and when it is necessary to bleed air out of the hydraulic brake system, this is done by loosening the valve slightly until the conical valve surface 71 is retracted from the conical seat 72 permitting the air bubbles to be forced through the bore 73 of the valve under the influence of pressure in the brake lines induced by actuating the brake pedal 74. In FIG. 2, we have shown schematically a brake pedal 74 which actuates the piston (not shown) in the master cylinder 75 for forcing the brake fluid through the conduit 76 into passage 50a to effect vehicle braking. It will be understood that the vehicle will have the usual four wheels with appropriate braking apparatus for each wheel, however, only one wheel assembly is shown.

By locating the passage 65 above the level of the wheel cylinder 63, the removal of air bubbles is assured since they will rise.

We claim:

1. A vehicle wheel assembly comprising: a wheel rim and body; a hollow hub formed at the center of the wheel body; a hollow hub support projecting through the hub and having an external wall spaced radially inwardly from the internal wall of the hollow hub; a brake drum housing anchored to the wheel body and forming in conjunction therewith a substantially liquid tight chamber; a wheel spindle rotatively supported internally of the hub support and connected to the brake drum housing for driving said housing and wheel rim and body; bearings interposed between the hub support and hub; a backing plate having its central portion anchored to the end face of the hub support; a hydraulic cylinder carried on the backing plate; said hub support having a passage therethrough; a hydraulic feed conduit leading into the hydraulic cylinder and having one end opening into the passage in the hub support, said feed conduit being located within the interior of the brake drum housing; said hub support having a second passage therein; a bleed conduit leading from the wheel cylinder and having one end opening into one end of the second passage; said second passage having its other end opening to atmosphere exteriorly of the brake drum housing and a bleed valve normally closing off the second passage.

2. A vehicle wheel assembly as set forth in claim 1 wherein the bleed passage in the hub support is situated above the level of the wheel cylinder.

References Cited in the file of this patent

UNITED STATES PATENTS

| | | |
|---|---|---|
| 1,516,664 | Blank | Nov. 25, 1924 |
| 2,209,784 | Maack et al. | July 30, 1940 |
| 2,213,383 | Canfield | Sept. 3, 1940 |
| 2,251,538 | Ash | Aug. 5, 1941 |
| 2,345,192 | Garnett et al. | Mar. 28, 1944 |
| 2,909,243 | Calvin | Oct. 20, 1959 |
| 3,028,932 | Cadmus | Apr. 10, 1962 |

UNITED STATES PATENT OFFICE
CERTIFICATE OF CORRECTION

Patent No. 3,162,270                           December 22, 1964

Louis Demas et al.

It is hereby certified that error appears in the above numbered patent requiring correction and that the said Letters Patent should read as corrected below.

In the grant, lines 3 and 4, and in the heading to the printed specification, line 5, for "a corporation of Wisconsin", each occurrence, read -- a corporation of Maryland --; column 1, line 26, for "meaus" read -- means --; line 57, for "conneciton" read -- connection --; column 2, line 22, for "Plate" read -- A plate --; line 56, strike out "are".

Signed and sealed this 1st day of June 1965.

(SEAL)
Attest:

ERNEST W. SWIDER
Attesting Officer

EDWARD J. BRENNER
                                                       Commissioner of Patents